United States Patent [19]

Toda et al.

[11] Patent Number: 4,876,071

[45] Date of Patent: Oct. 24, 1989

[54] MIXING APPARATUS FOR SYNTHETIC RESIN WITH MULTIPLE RESIN COMPONENTS

[75] Inventors: Kenichi Toda; Tetsuhiro Hori, both of Okazaki, Japan

[73] Assignee: Kabushiki Kaisha Polyurethane Engineering, Tokyo, Japan

[21] Appl. No.: 97,786

[22] Filed: Sep. 18, 1987

[30] Foreign Application Priority Data

Jun. 25, 1987 [JP] Japan .................. 62-158494

[51] Int. Cl.$^4$ ..................... B01F 5/04; B01F 15/02
[52] U.S. Cl. ..................... 422/133; 422/131; 422/224; 366/159
[58] Field of Search ............ 422/131, 133, 224; 366/137, 159, 173; 137/625.4, 625.48; 425/4 R, 4 C, 562; 134/8

[56] References Cited

U.S. PATENT DOCUMENTS

| | | | |
|---|---|---|---|
| 4,239,732 | 12/1980 | Schneider | 422/133 |
| 4,379,122 | 4/1983 | Taubenmann | 422/133 |
| 4,440,500 | 4/1984 | Schneider | 422/133 X |
| 4,452,919 | 6/1984 | Schneider | 422/133 X |
| 4,464,056 | 8/1984 | Schmitz et al. | 422/131 X |
| 4,490,048 | 12/1984 | Schlueter | 366/173 X |
| 4,510,120 | 4/1985 | Bauer | 422/133 |

*Primary Examiner*—Barry S. Richman
*Assistant Examiner*—Rebekah A. Griffith
*Attorney, Agent, or Firm*—Armstrong, Nikaido, Marmelstein, Kubovcik & Murray

[57] ABSTRACT

A mixing apparatus having a mixing chamber which has inlet ports of resin components to be mixed and an outlet port of a mixture thus obtained, comprising a flow varying member which moves across the mixing chamber to selectively occupy a retracted position in which it is retracted from the mixing chamber and a forward position in which the flow varying member interrupts the flow of the resin components to change the directions thereof, an immovable key member which defines a restriction passage together with the flow varying member which occupies the forward position, and a chamber block which is opposed to the flow varying member to laterally move in order to selectively occupy a forward position in which it defines a part of the mixing chamber and a retracted position in which the chamber block defines a flow varying chamber together with the key member and the flow varying member which occupies the forward position.

6 Claims, 4 Drawing Sheets

FIG. 7
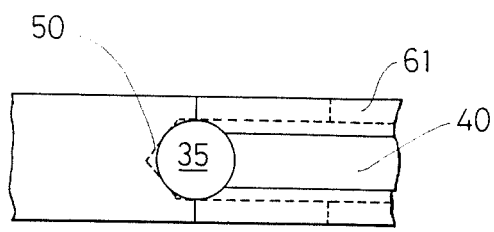
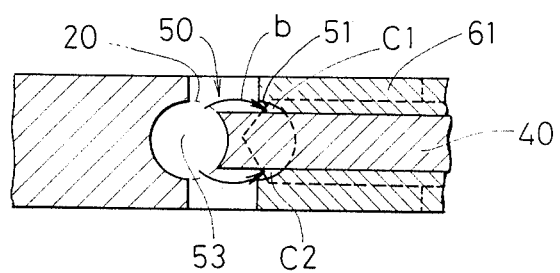
FIG. 8A
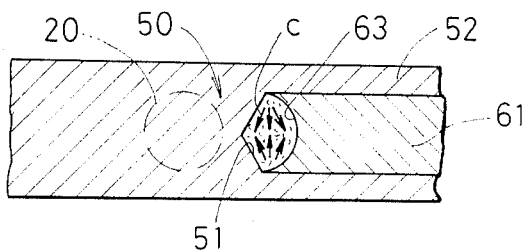
FIG. 8B
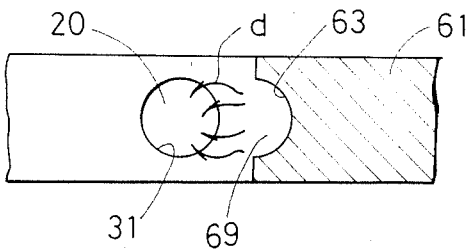
FIG. 8C

MIXING APPARATUS FOR SYNTHETIC RESIN WITH MULTIPLE RESIN COMPONENTS

BACKGROUND OF THE INVENTION

1. Field of the Invention

The present invention relates to a mixing apparatus for mixing different resin components which are chemically reactive, such as polyurethane resin or the like to introduce a mixture thus obtained into a molding cavity.

2. Description of the Related Art

For instance, in a molding process of polyurethane resin, a plurality of resin components which are chemically reactive to each other are introduced in a mixing chamber of a mixing appartus to mix and stir the resin components and then a mixture thus obtained is ejected into a predetermined molding cavity. In order to enhance the mixing and stirring effect of the resin components and to ensure a smooth flow of the mixture to be ejected into the molding cavity, it is necessary to provide restrictions or bent portions in the mixing chamber or in a passage through which the ejected mixture passes.

For example, Japanese Unexamined Patent Publication (Kokai) No. 58-167145 discloses a mixing head having a mixing chamber which has a plurality of buffers which come in and out of the mixing chamber.

Japanese Examined Patent Publication (Kokoku) No. 57-30062 discloses a mixing chamber in which a mixing slide is arranged so as to reciprocally move therein. The mixing slide has a hole which defines the mixing chamber and which controls and bends a flow passage of the resin components flowing out from the mixing chamber, in accordance with the position of the hole to increase the mixing efficiency.

However, in these prior arts, particularly in Kokai '145 which has a high restriction in which the passage of the resin mixture flowing out from the mixing chamber can be effectively restricted, it is difficult to make a smooth flow of the mixture at the ejecting portion.

In Kokoku '062, the change of the flow of the resin components largely depends on the volume of the mixing chamber, resulting in a decreased mixing efficiency.

Furthermore, in known mixing apparatuses including those mentioned above, it is next to impossible to compensate a possible insufficient to incomplete stirring of the resin components, due to a turbulence of the flow of the resin components at an initial stage of the mixing operation.

The primary object of the present invention is, therefore, to provide a mixing apparatus which is free from the drawbacks mentioned above and which has a remarkably increased mixing and stirring efficiency.

Another object of the present invention is to eliminate the problem that the resin components can not be sufficiently stireed, due to turbulence of the flow of the resin components especially at the commencement of the mixing operation.

Still another object of the present invention is to provide a mixing apparatus which can ensure a smooth flow (static flow) of the resin mixture which is ejected from the mixing chamber into a predetermined molding cavity.

SUMMARY OF THE INVENTION

To achieve the objects mentioned above, according to the present invention, there is provided a mixing apparatus having a body which has a through bore providing a mixing chamber with a plurality of inlet ports through which resin components to be mixed are fed into the mixing chamber and an outlet port from which a mixture of the resin components is discharged, and a cleaning member which reciprocally moves in the mixing chamber.

A pair of diametrically opposed passages are provided through the body to intersect the through bore between the inlet ports and the outlet port. A flow varying member is provided in one of the opposed passages so as to laterally move to selectively occupy a retracted position in which it is retracted from the mixing chamber and a forward position in which the flow varying member laterally extends in the mixing chamber to interrupt the flow of the resin components thereby to change the direction of the mixture flow. A key member is provided to cooperate with the flow varying member which is located in the forward position to define at least one restriction passage therebetween, and a chamber block which is provided in the other opposed passage to laterally move so as to selectively occupy a forward position in which it defines a part of the mixing chamber and a retracted position in which the chamber block cooperates with the key member and the flow varying member which is located in the forward position to define a flow varying chamber which is connected to the restriction passage.

BRIEF DESCRIPTION OF THE DRAWINGS

The invention will be described below in detail with reference to the drawings, in which;

FIG. 7 is a plan view of a main part of a mixing apparatus, in a position in which a mixing operation ends; and, FIGS. 8A, 8B and 8C are sectional views taken along the lines A—A, B—B and C—C in FIG. 6, in a mixing position.

DETAILED DESCRIPTION OF EMBODIMENTS

Figure 1:
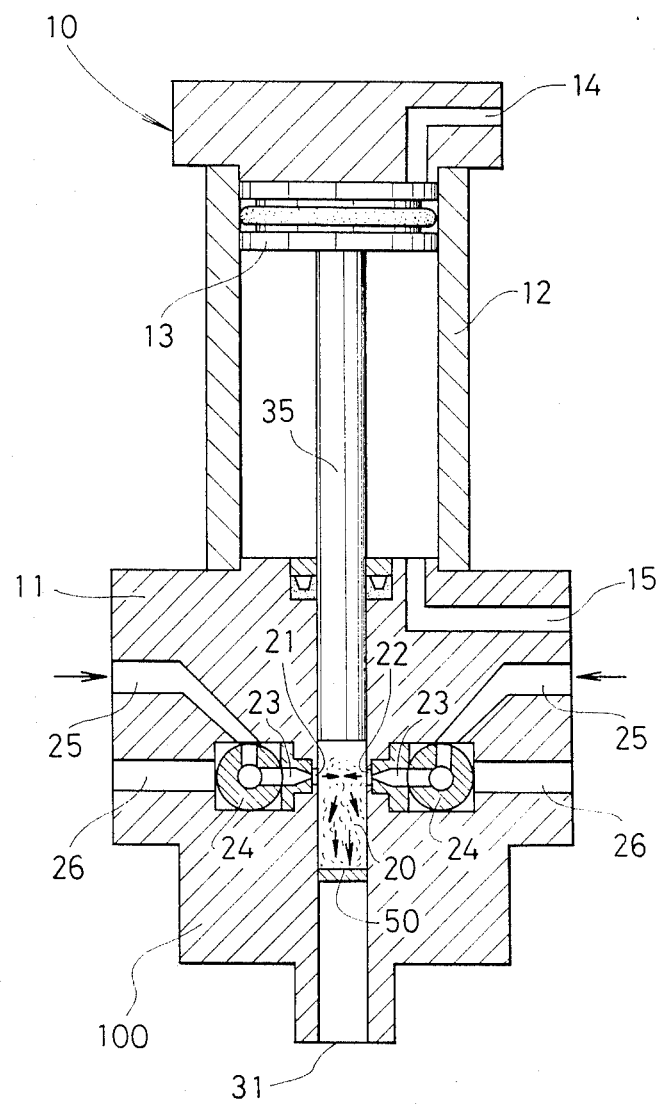
FIG. 1 is a longitudinal sectional view of a mixing apparatus for synthetic resin having multiple resin components.

The mixing apparatus 10 shown in FIG. 1 is adapted to mix and stir a plurality of resin components to make polyurethane resin. The apparatus 10 has a body 100 having a through bore which provides a mixing chamber 20 which and has inlet ports 21 and 22 for introducing resin components and an ejection port 31 for ejecting a mixture produced in the mixing chamber 20. In the mixing chamber 20 is provided a cleaning rod 35 which reciprocally moves in the mixing chamber 20. The numeral 11 resignates a body block, 12 a cylinder in which the cleaning rod 35 moves, 13 a piston of the cleaning rod 35, and 14 and 15 inlet and outlet passages of a working fluid of the cylinder, respectively.

The inlet ports 21 and 22 have injection nozzles 23 which are controlled by valves 24, respectively. The resin components which are stored in reservoirs (not shown) are seclectively introduced into the mixing chamber 20 through inlet passages 25 connected to the respective reservoirs, by means of the control valves 24, respectively. When the control valves 24 break the fluid connection between the inlet ports 21, 22 and the respective inlet passages 25, the resin components are returned to the respective reservoirs through discharge passages 26.

Figure 2:
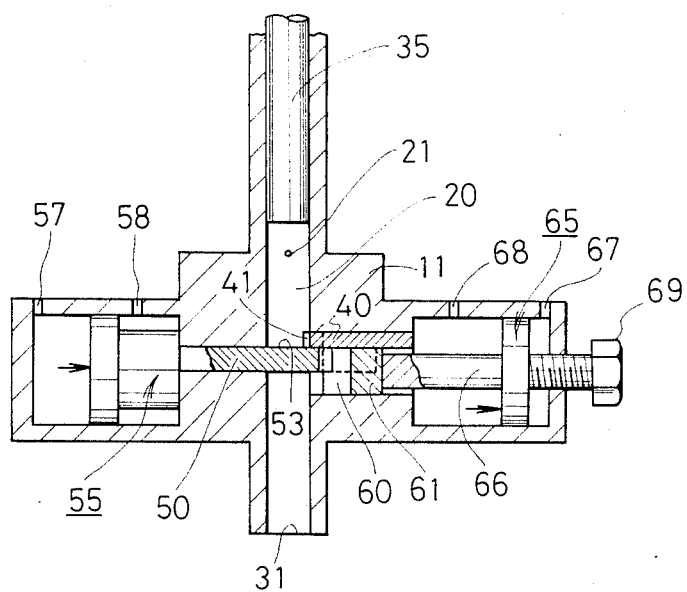
FIG. 2 is an enlarged longitudinal sectional view of a main part of a mixing apparatus shown in FIG. 1, but in a phase different from that of FIG. 1 by 90 degrees.
Figure 3:
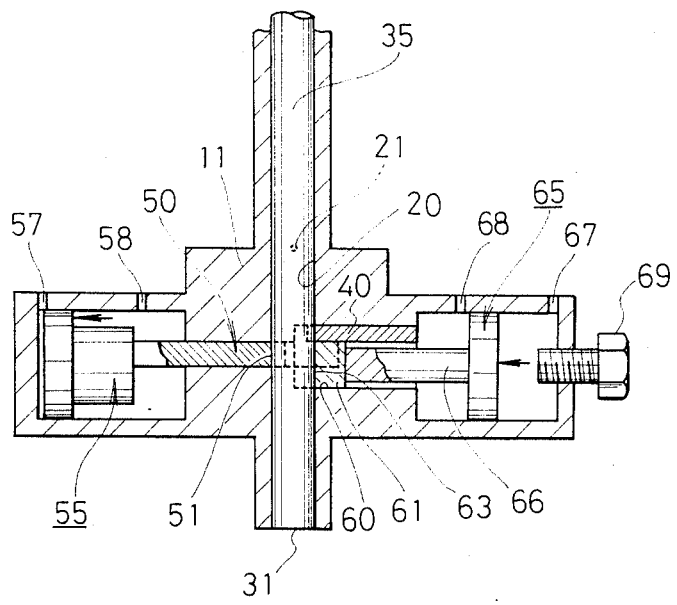
FIG. 3 is a longitudinal sectional view of mixing apparatus similar to FIG. 2, but shown in a different position in which the mixing operation ends.

In FIGS. 2 and 3 which show sectional views sectioned along a plane having a phase different from that of FIG. 1 by 90 degrees, an immovable key member 40, a flow varying member 50 and a chamber block 61 which defines a flow varying chamber 60 are provided in a pair of diametrically opposed passages which extend through the body 100 and intersect the through bore between the inlet ports 21, 22 and the outlet port 31, according to the present invention.

More than three inlet ports can be provided, depending on the kind of the resin components to be mixed.

Figure 5:
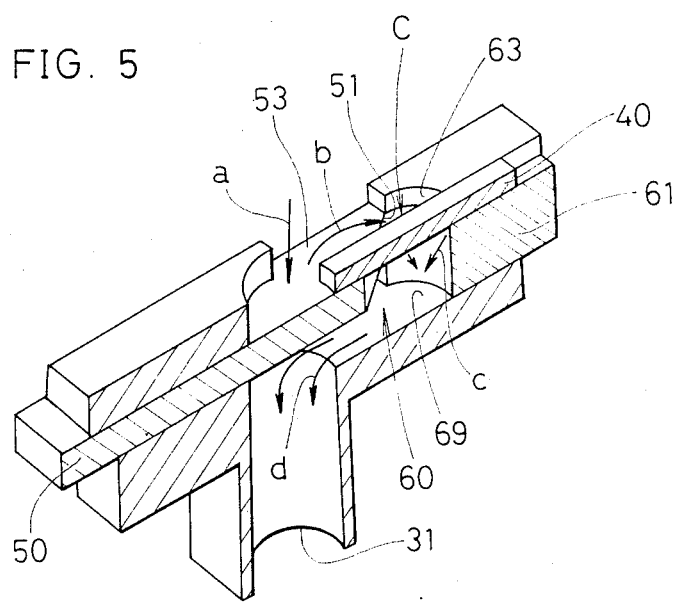
FIG. 5 is a partially broken perspective view of a main part of a mixing apparatus including a flow varying member and a chamber block shown in FIG. 4.

The key member 40 is in the form of an elongated piece of plate having a front end which projects in the mixing chamber 20 and is secured to the body block 11, as can be seen from FIGS. 2, 5 and 8A.

The flow varying member 50 is connected to a hydraulic cylinder device 55 so as to reciprocally move in a direction perpendicular to the lengthwise direction of the mixing chamber 20. The cylinder device 55 has two ports 57 and 58 through which a working fluid can be introduced in and discharged from the cylinder device 55.

When the flow varying member 50 is retracted by the cylinder device 55 (retracted position), as shown in FIG. 3. a recessed portion 51 thereof defines a part of mixing chamber. This state corresponds to a position in which the mixing operation stops.

When the flow varying member 50 which is made of a plate in the illustrated embodiment moves forward (forward position), which corresponds to a position in which the mixing operation takes place as shown by FIG. 5, the flow varying member 50 extends across the mixing chamber 20, so that the resin components introduced from the inlet ports 21 and 22 into the mixing chamber 20 are changed in the flow direction by 90 degree by an upper surface 53 of the varying member 50. The flow varying member 50 completely interrupts the flow of resin components towards the outlet port 31 from inlet ports 21, 22. In the position shown in FIG. 2, the flow varying member 50 defines a restriction passage C together with the key member 40 provided in the body block 11 at the recessed portion 51 of the flow varying member 50, so that the resin components can be introduced in the flow varying chamber 60 through the restriction passage C.

The flow varying chamber 60 is formed by the chamber block 61 when the latter moves backward (retracted position) in the flow varying chamber 60. Namely, as can be seen from FIG. 2, the chamber block 61 is connected to a piston rod 66 of a hydraulic cylinder device (actuator) 65 provided in rear of the chamber block 61, so that the chamber block 61 can be actuated by the cylinder device 65 to reciprocally move forward (forward position) and backward in the flow varying chamber 60.

The working fluid of the cylinder device 65 is introduced in and discharged from the cylinder device 65 through cylinder ports 67 and 68.

When the chamber block 61 moves forward, which corresponds to a position in which the mixing operation stops, a recessed portion 63 of the chamber block 61 defines the mixing chamber 20, as can be seen in FIG. 3.

When the chamber block 61 moves backward, which corresponds to a operational position in which the mixing operation is effected, the flow varying chamber 60 which is connected to the restriction passage C is formed under the key member 40 and the flow varying member 50 which occupies the forward position mentioned above, as shown in FIG. 2. Note that the volume of the flow varying chamber 60 can be optionally determined by an adjusting screw 69 which is adjustably attached to the cylinder device 65 to adjust the backward displacement of the piston of the cylinder device 65.

Figure 4:
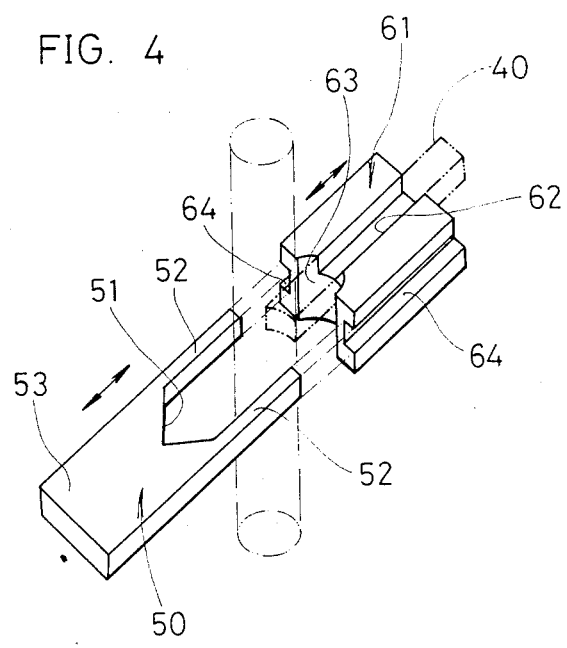
FIG. 4 is a perspective view of a flow varying member and a chamber block.
Figure 6:
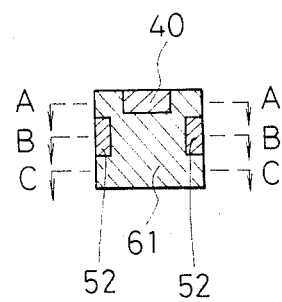
FIG. 6 is a sectional view of a flow varying member and a chamber block showing a geometrical arrangement thereof.

The key member 40, the flow varying chamber 50 and the chamber block 61 defining the flow varying chamber 60 cooperate, as shown in FIGS. 4, 5 and 6. In FIGS. 4, 5 and 6, the chamber block 61 is provided, on its upper portion, with a key groove 62 in which the key member 40 is slidably fitted. Also, the chamber block 61 is provided, on its opposite sides, with sliding channels 64 in which arms 52 of the flow varying member 50 are slidably fitted, so that a smooth relative sliding movement takes place between the flow varying member 50 and the chamber block 61.

The mixing apparatus of the present invention operates as follows.

FIGS. 1, 2, and 5 show a mixing state, in which the cleaning member 35 is located in a retracted position, so that the resin components are injected from the respective inlet ports 21 and 22, through the control valves 24 which are made ON, into the mixing chamber 20. The injected resin components collide with each other and flow downward in the mixing chamber 20 while being stirred, as shown at a in FIG. 5.

Since the flow varying member 50 extends across the mixing chamber 20 directly below the inlet ports 21 and 22, as mentioned above, the resin components are interrupted by the flow varying member 50, so that the flows of the resin components come into collision with the upper surface 53 of the flow varying member 50. As a result of the collision, the directions of the flows of the resin components are changed approximately by 90 degree, as shown by an arrow b in FIG. 5.

The resin components which are changed in their flow directions are injected from the restriction passage C which is defined between the recessed portion 51 of the flow varying member 50 and the key member 40, into the flow varying chamber 60 which is located below the restriction passage C. When the resin components pass through the restriction passage C, the flow velocity thereof is such that second stirring and flow varying take place in the mixing chamber 60, as shown by arrows c in FIG. 5.

In the illustrated embodiment, the restriction passage C has two divided passages C1 and C2 on the opposite sides of the key member 40, as shown in FIG. 8A. The provision of two divided restriction passages C1 and C2 contributes to a further increase of the mixing efficiency, since the resin components once divided into two flows by the restriction passages C1 and C2 are mixed again in the flow varying chamber 60 downstream the restriction passages C1 and C2 as shown by FIG. 8B.

The resin components which are mixed secondarily in the flow varying chamber 60 are then fed into the outlet port 31 of the mixing chamber 20 through a space defined below the flow varying member 50, as shown by an arrow d in FIG. 5 and FIG. 8C. Since the outlet port 31 is an open space, the flow of the mixed resin components (mixture) has a decreased velocity in the outlet port 31.

As can be seen from the foregoing, according to the present invention, the resin components are mixed and stirred twice, first in the mixing chamber 20 in the vicinity of the inlet ports 21 and 22, and second in the flow varying chamber 60, and accordingly, the mixing efficiency can be remarkably increased.

In one example, the flow velocity of the resin components in the mixing chamber directly downstream of the inlet ports 21 and 22 in which the first mixing took place was 100 m/s, and the flow velocity of the mixture in the restriction passage C in which the second mixing took place was 70 m/s.

FIGS. 3 and 7 show a position in which the mixing operation stops. In this position, the control valves 24 are made OFF, so that no resin component is fed into the mixing chamber 20. As can be seen from FIGS. 3 and 7, the flow varying member 50 is located in a retracted position to be retracted into the inner wall of the mixing chamber 20, and the chamber block 61 moves forward to force the resin components in the flow varying chamber 60 into the mixing chamber 20. At the same time, the cleaning member 35 moves in the mixing chamber 20 to discharge the residual of the resin components from the mixing apparatus through the outlet port 31. This results in completion of the cleaning operation of the flow varying chamber 60 and the mixing chamber 20 to prepare for next mixing operation.

According to the present invention, as can be understood from the above discussion, the resin components which are introduced into the mixing chamber 20 through the respective inlet ports are stirred and mixed in the mixing chamber 20 in the vicinity of the inlet ports 21 and 22, and then flow downward in the mixing chamber 20 and come into collision with the flow varying member 50. The flow directions of the resin components are changed by about 90 degree by the flow varying member, so that the resin components pass through the restriction passage(s) C which is(are) defined between the recessed portion of the flow varying member and the key member and are injected into the flow varying chamber, in which the second mixing operation takes place.

When there are two restriction passages C1 and C2, a more effective mixing can be ensured, since the resin components are divided into two flows corresponding to the two restriction passages and are mixed and stirred again downstream the restriction passages. It is also possible to provide more than two restriction passages in order to further increase the mixing efficiency.

After the second mixing takes place, the flow direction of the mixture is changed again by about 90 degree toward the mixing chamber, so that the flow velocity of the mixture which has been accelerated by the restriction passage(s) is reduced. Consequently, a smooth flow of the mixture is discharged through the outlet port into the molding cavity (not shown).

As can be seen from the foregoing, the first mixing- the first change of the flow direction- the second mixing- the second change of the flow direction successively take place, in the present invention, and accordingly, the mixing efficiency can be increased and a smooth flow of the mixture to be discharged from the mixing apparatus into the molding cavity can be provided.

Furthermore, according to the present invention, the problem of incomplete or insufficient mixing of the resin components due to the turbulence of the initial flow of the resin components at the commencement of the mixing operation can be eliminated.

According to the present invention, it is possible to vary the cross sectional area of the restrction passage(s) by the profile of the recessed portion of the flow varying member and by the displacement of the same. In addition, the volume of the flow varying chamber can be easily varied by the adjustment of the axial displacement of the chamber block depending on the mixing conditions or the like.

We claim:

1. A mixing apparatus for resin components comprising:
   a body having a through bore and a plurality of inlet ports for introducing resin components into a mixing chamber portion of said bore,
   a cleaning member mounted for reciprocal movement in said bore to displace said resin components from said mixing chamber to an outlet port of said bore;
   a pair of diametrically opposed passages extending through said body and intersecting said through bore between said inlet ports and said outlet port of said through bore,
   a flow varying member slidably mounted in one of said passages for movement between a retracted position and a forward position, said flow varying member having an end portion which is aligned with said bore in said retracted position and located internally of the other said passage in the forward position,
   a chamber block slidably mounted in the other said passage for movement between a forward position and a retracted position, said chamber block having a end portion which defines a part of said through bore in said forward position and partially defines a flow varying chamber in said retracted position, and
   a key member fixed in the other said passage and dividing the other said passage into at least one smaller restriction passage,
   whereby said flow varying member in said forward position closes said through bore to movement of said resin components and said end portion of said flow varying member cooperates with said end portion of said chamber block to provide a laterally displaced flow varying chamber accessible in the other said passage through said restriction passage for movement of said resin components from said mixing chamber to said outlet of said bore.

2. A mixing apparatus according to claim 1, further comprising control valves which selectively connect the inlet ports to respective sources of the resin components.

3. A mixing apparatus according to claim 1, further comprising adjustable means for limiting movement of the chamber block to vary the volume of the flow varying chamber.

4. A mixing apparatus according to claim 1, wherein said end portion of said flow varying member is provided with a recess which defines a part of the mixing chamber when the flow varying member occupies the retracted position and which defines said restriction passage together with the key member when said flow varying member occupies the forward position.

5. A mixing apparatus according to claim 1, further comprising means for moving the flow varying member.

6. A moving apparatus according to claim 1, further comprising means for moving the chamber block.

* * * * *